United States Patent
Ren et al.

(10) Patent No.: US 12,242,747 B2
(45) Date of Patent: Mar. 4, 2025

(54) DATA DEDUPLICATION METHOD AND APPARATUS, AND COMPUTER PROGRAM PRODUCT

(71) Applicant: Huawei Technologies Co., Ltd., Shenzhen (CN)

(72) Inventors: Ren Ren, Shanghai (CN); Chen Wang, Shenzhen (CN); Haijun Dai, Chengdu (CN); Fangfang Zhu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/829,964

(22) Filed: Jun. 1, 2022

(65) Prior Publication Data
US 2022/0300180 A1    Sep. 22, 2022

Related U.S. Application Data

(63) Continuation of application No. 17/648,874, filed on Jan. 25, 2022, which is a continuation of application No. PCT/CN2019/097804, filed on Jul. 26, 2019.

(51) Int. Cl.
*G06F 3/06* (2006.01)

(52) U.S. Cl.
CPC .......... *G06F 3/0641* (2013.01); *G06F 3/0608* (2013.01); *G06F 3/0673* (2013.01)

(58) Field of Classification Search
CPC .... G06F 3/0641; G06F 3/0608; G06F 3/0673; G06F 3/061; G06F 3/067; G06F 3/0685; G06F 3/0629; G06F 3/0671
See application file for complete search history.

(56) References Cited

U.S. PATENT DOCUMENTS

| | | | | |
|---|---|---|---|---|
| 8,539,148 B1 * | 9/2013 | Chen | ...................... | G06F 3/0641 |
| | | | | 711/112 |
| 8,572,163 B1 * | 10/2013 | Bromley | ............. | G06F 16/1748 |
| | | | | 707/650 |
| 8,732,403 B1 * | 5/2014 | Nayak | ................... | G06F 3/0619 |
| | | | | 711/170 |
| 9,384,205 B1 * | 7/2016 | Gipp | ...................... | G06F 16/152 |
| 9,575,681 B1 * | 2/2017 | Fisher | ................... | G06F 3/0688 |
| 9,715,434 B1 * | 7/2017 | Xu | .......................... | G06F 3/067 |
| 9,733,836 B1 * | 8/2017 | Garg | ...................... | G06F 3/0641 |

(Continued)

FOREIGN PATENT DOCUMENTS

| CN | 103049508 A | 4/2013 |
|---|---|---|
| CN | 106610790 A | 5/2017 |

(Continued)

OTHER PUBLICATIONS

Microsoft, "Computer Dictionary", Fifth Edition, May 1, 2002, 3 pages.

(Continued)

*Primary Examiner* — Christopher D Birkhimer

(74) *Attorney, Agent, or Firm* — Slater Matsil, LLP

(57) ABSTRACT

A data processing method in a storage system is provided. The method includes: when the storage system is under a first load, performing an inline deduplication operation; and when the storage system is under a second load, directly storing a received second data block without performing the inline deduplication operation, where the first load is less than the second load.

21 Claims, 5 Drawing Sheets

(56) References Cited

U.S. PATENT DOCUMENTS

| | | | |
|---|---|---|---|
| 10,001,942 B1* | 6/2018 | Sharma | G06F 3/0641 |
| 10,108,543 B1* | 10/2018 | Duggal | G06F 11/14 |
| 10,108,544 B1* | 10/2018 | Duggal | G06F 11/14 |
| 10,228,858 B1* | 3/2019 | Stoakes | G06F 3/0641 |
| 10,346,076 B1* | 7/2019 | Jonnala | G06F 3/067 |
| 10,664,165 B1* | 5/2020 | Faibish | G06F 3/0638 |
| 10,754,696 B1* | 8/2020 | Chinnam | G06F 11/1453 |
| 10,795,812 B1* | 10/2020 | Duggal | G06F 3/067 |
| 11,455,282 B1* | 9/2022 | Kulkarni | G06F 16/1748 |
| 2008/0144079 A1* | 6/2008 | Pandey | H03M 7/30 358/1.15 |
| 2010/0077013 A1* | 3/2010 | Clements | G06F 16/1748 707/822 |
| 2010/0088296 A1* | 4/2010 | Periyagaram | G06F 16/183 707/E17.014 |
| 2010/0125553 A1* | 5/2010 | Huang | G06F 11/1453 707/661 |
| 2010/0174881 A1* | 7/2010 | Anglin | G06F 11/1453 711/E12.103 |
| 2010/0281081 A1* | 11/2010 | Stager | G06F 9/5022 707/814 |
| 2010/0333116 A1* | 12/2010 | Prahlad | G06F 3/0649 713/153 |
| 2013/0086006 A1* | 4/2013 | Colgrove | G06F 16/137 707/E17.005 |
| 2013/0097380 A1* | 4/2013 | Colgrove | G06F 16/1752 711/E12.017 |
| 2014/0114932 A1* | 4/2014 | Mallaiah | G06F 3/0641 707/E17.032 |
| 2014/0214794 A1 | 7/2014 | Attaluri et al. | |
| 2014/0281361 A1 | 9/2014 | Park et al. | |
| 2014/0297980 A1 | 10/2014 | Yamazaki | |
| 2015/0058595 A1 | 2/2015 | Gura et al. | |
| 2015/0127919 A1 | 5/2015 | Baldwin et al. | |
| 2015/0205816 A1* | 7/2015 | Periyagaram | G06F 11/1453 707/827 |
| 2015/0261776 A1* | 9/2015 | Attarde | G06F 16/1748 707/664 |
| 2016/0092138 A1* | 3/2016 | Knestele | G06F 3/0688 711/103 |
| 2016/0246799 A1* | 8/2016 | Constantinescu | G06F 16/1748 |
| 2016/0283165 A1* | 9/2016 | Robinson | G06F 3/0686 |
| 2016/0350324 A1* | 12/2016 | Wang | G06F 16/137 |
| 2017/0010809 A1* | 1/2017 | Hironaka | G06F 3/0689 |
| 2017/0038978 A1* | 2/2017 | Li | G06F 3/0611 |
| 2017/0147648 A1 | 5/2017 | Aronovich | |
| 2017/0177223 A1* | 6/2017 | Zhang | G06F 3/0619 |
| 2017/0177489 A1* | 6/2017 | Zhang | G06F 3/0641 |
| 2017/0177899 A1* | 6/2017 | Ng | G06F 16/1748 |
| 2018/0067680 A1 | 3/2018 | Ohtsuji | |
| 2018/0089261 A1 | 3/2018 | Li et al. | |
| 2018/0137163 A1 | 5/2018 | Bensberg et al. | |
| 2018/0137164 A1 | 5/2018 | Bensberg et al. | |
| 2018/0143994 A1* | 5/2018 | Ohtsuji | G06F 3/0611 |
| 2018/0239553 A1* | 8/2018 | Lan | G06F 3/0641 |
| 2018/0270128 A1* | 9/2018 | Auvenshine | H04L 43/16 |
| 2018/0300078 A1* | 10/2018 | Korondi | G06F 3/0674 |
| 2018/0314727 A1* | 11/2018 | Epstein | G06N 5/01 |
| 2018/0367161 A1* | 12/2018 | Ki | H03M 7/6088 |
| 2019/0095112 A1* | 3/2019 | Lingarajappa | G06F 12/1408 |
| 2020/0241971 A1* | 7/2020 | Madan | G06F 3/0671 |
| 2020/0310686 A1* | 10/2020 | Truong | G06F 3/061 |
| 2021/0374021 A1* | 12/2021 | Santhakumar | G06F 11/3485 |

FOREIGN PATENT DOCUMENTS

| | | | | |
|---|---|---|---|---|
| CN | 107209714 A | | 9/2017 | |
| CN | 107329692 A | | 11/2017 | |
| CN | 107391761 A | | 11/2017 | |
| CN | 108762679 A | | 11/2018 | |
| CN | 109542360 A | | 3/2019 | |
| EP | 3993273 A1 | * | 5/2022 | G06F 3/0608 |
| JP | 2019159785 A | * | 9/2019 | G11B 7/08582 |

OTHER PUBLICATIONS

Handy, J., "The Cache Memory Book", Academic Press, Inc., Second Edition, Jan. 27, 1998, 11 Pages.

* cited by examiner

| Fingerprint | Storage address | Reference count |
|---|---|---|
| Fingerprint A | SD | 1 |

DATA DEDUPLICATION METHOD AND APPARATUS, AND COMPUTER PROGRAM PRODUCT

CROSS-REFERENCE TO RELATED APPLICATIONS

This application is a continuation of U.S. patent application Ser. No. 17/648,874, filed on Jan. 25, 2022, which is a continuation of International Application No. PCT/CN2019/097804, filed on Jul. 26, 2019. Both of the aforementioned applications are hereby incorporated by reference in their entireties.

TECHNICAL FIELD

The present disclosure relates to the field of information technologies, and more specifically, to a data processing method and apparatus, and a computer readable storage medium.

BACKGROUND

As a technology that saves data storage space in a storage system, deduplication is quickly proliferating and has high market value. Inline deduplication removes redundancies from data before the data is written to a hard disk, to achieve data reduction. An advantage is that a number of write times of a hard disk can be reduced. However, for the inline deduplication, it needs to query whether a fingerprint table includes a fingerprint same as that of a data block. The fingerprint query can cause a large quantity of resource overheads and affect performance of the storage system.

SUMMARY

The present disclosure provides a data processing method in a storage system, to reduce resource overheads of the storage system and improve storage performance of the storage system.

According to a first aspect, a data processing method in a storage system is provided. The method includes: calculating a first fingerprint of a first data block; and when the storage system is under a first load, performing an inline deduplication operation on the first data block by querying a fingerprint table based on the first fingerprint; calculating a second fingerprint of a second data block; and when the storage system is under a second load, directly storing the second data block without performing the inline deduplication operation; and recording a mapping entry between the second fingerprint and a first storage address of the second data block, where the mapping entry is used to record mapping between the second fingerprint and the first storage address of the second data block. The first load is less than the second load. In this solution, the storage system determines, based on the load of the storage system, whether to perform the inline deduplication operation on a data block that is not stored. This can reduce resource overheads of the storage system, and improve performance of the storage system.

In an optional implementation, the method further includes: querying, based on the second fingerprint, whether the fingerprint table includes a first fingerprint entry, where the first fingerprint entry includes mapping between the second fingerprint and a second storage address, and the second storage address stores a data block that has same content as the second data block; when the fingerprint table includes the first fingerprint entry, establishing mapping between a logical address of the second data block and the second fingerprint in the first fingerprint entry; when the fingerprint table does not include the first fingerprint entry, adding a second fingerprint entry to the fingerprint table, where the second fingerprint entry includes mapping between the second fingerprint and a third storage address, and the third storage address is used to store a storage address of a second data block migrated by the storage system from the first storage address; and establishing mapping between the logical address of the second data block and the second fingerprint. In this solution, deduplication is further performed on a stored data block on which the inline deduplication is not performed. This can release and save storage space.

In an optional implementation, after the deduplication operation is further performed on the stored data block on which the inline deduplication operation is not performed, the mapping entry between the second fingerprint and the first storage address of the second data block is deleted, to release storage space.

In an optional implementation, the recording a mapping entry between the second fingerprint and a first storage address of the second data block specifically includes: recording, in a log, the mapping entry between the second fingerprint and the first storage address of the second data block. The mapping entry between the second fingerprint and the first storage address of the second data block is persistently recorded in the log. This can prevent fingerprint information from being lost, to help perform the deduplication operation.

Further, in an optional implementation, the method further includes: determining whether a plurality of mapping entries recorded in the log include the second fingerprint, where the plurality of mapping entries all include the second fingerprint, but storage addresses in the plurality of mapping entries are different; and establishing mapping between a logical address of a data block stored at another storage address other than the first storage address in the plurality of mapping entries and the second fingerprint in the fingerprint table.

Further, in an optional implementation, the method further includes: selecting the first storage address from the storage addresses in the plurality of mapping entries according to a migration policy, and migrating the second data block at the first storage address to the third storage address.

In an optional implementation, the migration policy includes at least one of whether the data block is compressed, a compression rate of a compression algorithm used when the data block is compressed, or a distance between the storage addresses in the plurality of mapping entries and storage space in which the third storage address is located.

In an optional implementation, when the data block at the first storage address is a compressed data block, the data block at the first storage address is migrated to the third storage address and does not need to be decompressed. Further, in an optional implementation, the data block does not need to be compressed again.

A plurality of mapping entries with a same fingerprint, for example, the second fingerprint, are recorded in the log. The storage addresses in the plurality of mapping entries are different. These storage addresses may be located on a plurality of storage nodes that use distributed storage. Data blocks at the storage addresses may be data blocks that are stored after being compressed. These data blocks may be compressed by using different compression algorithms. In other words, a compression rate and compression performance of a compression algorithm used by each data block varies.

The storage address in the fingerprint entry of the fingerprint table provided in this embodiment of the present invention is dedicated storage space allocated by the storage system, and the storage space is used to store a data block on which the deduplication operation (inline deduplication and post-deduplication) is performed. Therefore, for a data block that is directly stored and on which the inline deduplication operation is not performed, a corresponding fingerprint is not found in the fingerprint table after the post-deduplication operation is performed, and the data block needs to be migrated to storage space dedicated to store a data block on which the deduplication operation is performed. When the fingerprint table does not include the first fingerprint entry, a second fingerprint entry is added to the fingerprint table, where the second fingerprint entry includes mapping between the second fingerprint and a third storage address, and the third storage address is used to store a storage address of a second data block migrated by the storage system from the first storage address.

In a scenario in which the plurality of mapping entries with the same fingerprint are recorded in the log, when it is determined that the same fingerprint is a new fingerprint in the storage system, one storage address is selected from a plurality of storage addresses in the plurality of mapping entries, a data block at the selected storage address is migrated to storage space dedicated to store a data block on which the deduplication operation is performed. For example, when the fingerprint table does not include the first fingerprint entry, third storage space in the second fingerprint entry is added to the fingerprint table. A new fingerprint entry is established in the fingerprint table. When a data block that needs to be migrated is selected from the plurality of data blocks with the same fingerprint, the to-be-migrated data block is selected based on factors such as whether the data block is compressed, a compression rate of the data block, a distance between the data block and storage space dedicated to store a data block on which the deduplication operation is performed. In other words, the to-be-migrated data block is a data block that needs to be reserved after the post-deduplication operation is performed. A compressed data block is preferentially used as a to-be-migrated data block than a decompressed data block. A data block that is compressed by using a compression algorithm with a high compression rate is preferentially used as a to-be-migrated data block than a data block that is compressed by using a compression algorithm with a low compression rate. A data block that has a short distance from migrating to storage space dedicated to store a data block on which the deduplication operation is performed is preferentially used as a to-be-migrated data block than a data block that has a long distance from migrating to storage space dedicated to store a data block on which the deduplication operation is performed. When the to-be-migrated data block is selected based on the at least two factors, priorities in descending order are as follows: a data block that has a short distance from migrating to storage space dedicated to store a data block on which the deduplication operation is performed and that is compressed by using a compression algorithm with a high compression rate, a data block that has a long distance from migrating to storage space dedicated to store a data block on which the deduplication operation is performed and that is compressed by using a compression algorithm with a high compression rate, a data block that has a short distance from migrating to storage space dedicated to store a data block on which the deduplication operation is performed and that is compressed by using a compression algorithm with a low compression rate, a data block that has a long distance from migrating to storage space dedicated to store a data block on which the deduplication operation is performed and that is compressed by using a compression algorithm with a low compression rate, a data block that has a short distance from migrating to storage space dedicated to store a data block on which the deduplication operation is performed and that is not compressed, and a data block that has a long distance from migrating to storage space dedicated to store a data block on which the deduplication operation is performed and that is not compressed. In this embodiment of the present invention, in a process of migrating the compressed data block, the data block does not need to be decompressed.

Further, in an optional implementation, the method further includes: deleting the plurality of mapping entries.

According to a second aspect, a data processing apparatus is provided. The apparatus includes a module configured to perform the method according to any one of the first aspect or the possible implementations of the first aspect.

According to a third aspect, a data processing apparatus is provided. The data processing apparatus includes an interface and a processor, the interface communicates with the processor, and the processor is further configured to perform the method in any one of the first aspect or the possible implementations of the first aspect.

According to a fifth aspect, a computer-readable storage medium is provided. The computer-readable storage medium stores an instruction, and when a processor of a computer executes the instruction, the processor is configured to perform the method in any one of the first aspect or the possible implementations of the first aspect.

According to a sixth aspect, a computer program product including an instruction is provided. When a processor of a computer executes the instruction in the computer program product, the processor is configured to perform the method in any one of the first aspect or the possible implementations of the first aspect.

According to a seventh aspect, a data processing method is provided. The method includes: determining that a fingerprint table does not include fingerprints in a plurality of mapping entries, where the plurality of mapping entries include a same fingerprint, but all storage addresses in the plurality of mapping entries are different, and the storage addresses in the plurality of mapping entries are used to store a data block corresponding to the fingerprint; selecting a first storage address from the storage addresses in the plurality of mapping entries according to a migration policy, and migrating a data block at the first storage address to a second storage address, where the second storage address is used to store a storage address in storage space of a data block on which a deduplication operation is performed; and establishing, in the fingerprint table, a fingerprint entry that includes mapping between the fingerprint and the second storage address. In this solution, the foregoing data block migration policy can be used to reduce resource consumption of the storage system in a data migration process and to improve performance of the storage system.

In an optional implementation, the migration policy includes at least one of whether the data block is compressed, a compression rate of a compression algorithm used when the data block is compressed, and a distance between the storage addresses in the plurality of mapping entries and storage space in which the second storage address is located.

In an optional implementation, when the data block at the first storage address is a compressed data block, the data block at the first storage address is migrated to the second storage address and does not need to be decompressed. Further, in an optional implementation, the data block does not need to be compressed again.

According to an eighth aspect, a data processing apparatus is provided. The apparatus includes a module configured to perform the method according to any one of the seventh aspect or the possible implementations of the seventh aspect.

According to a ninth aspect, a data processing apparatus is provided. The data processing apparatus includes an interface and a processor, the interface communicates with the processor, and the processor is further configured to perform the method in any one of the seventh aspect or the possible implementations of the seventh aspect.

According to a tenth aspect, a computer-readable storage medium is provided. The computer-readable storage medium stores an instruction, and when a processor of a computer executes the instruction, the processor is configured to perform the method in any one of the seventh aspect or the possible implementations of the seventh aspect.

According to an eleventh aspect, a computer program product including an instruction is provided. When a processor of a computer executes the instruction in the computer program product, the processor is configured to perform the method in any one of the seventh aspect or the possible implementations of the seventh aspect.

DETAILED DESCRIPTION OF ILLUSTRATIVE EMBODIMENTS

The following describes technical solutions in embodiments of the present invention with reference to accompanying drawings.

First, a storage system applicable to the embodiments of the present invention is described.

Figure 1:
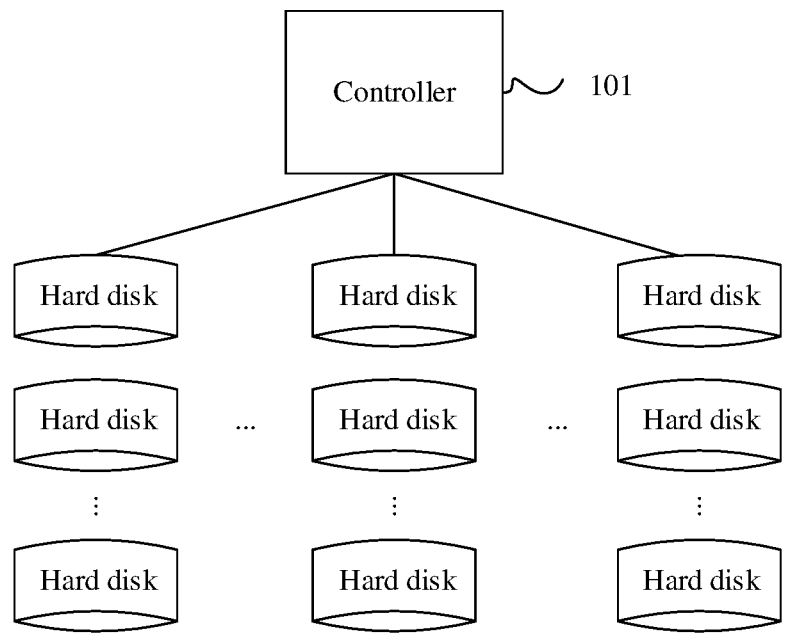
FIG. 1 is a schematic architectural diagram of a storage system according to an embodiment of the present invention.
Figure 2:
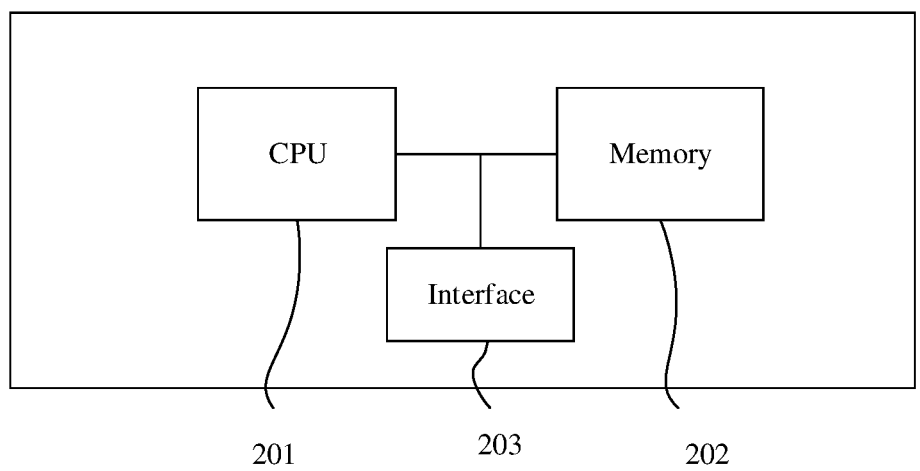
FIG. 2 is a schematic structural diagram of a storage controller according to an embodiment of the present invention.

As shown in FIG. 1, the storage system in this embodiment of the present invention may be a storage array (for example, the Oceanstor®18000 series and the Oceanstor® Dorado® series of Huawei®). The storage array includes a storage controller 101 and a plurality of hard disks, and the hard disk includes a solid state drive (Solid State Disk, SSD), a disk, or the like. As shown in FIG. 2, the storage controller 101 includes a central processing unit (CPU) 201, a memory 202, and an interface 203. The memory 202 stores a computer instruction. The CPU 201 executes the computer instruction in the memory 202 to perform management and data access operations on the storage system. In addition, the processor 201 may be a central processing unit (CPU), or may be a field programmable gate array (FPGA), or other hardware may be used as a processor, or an FPGA or other hardware and a CPU together are used as a processor, and the processor communicates with the interface 203. The memory 202 in the embodiments of the present invention may provide a memory for the CPU. The interface 203 may be a network interface card (NIC), a host bus adapter (HBA), or the like.

In the storage array described in FIG. 1 and FIG. 2, the controller 101 is configured to perform the data processing method in the embodiments of the present invention.

Figure 3:
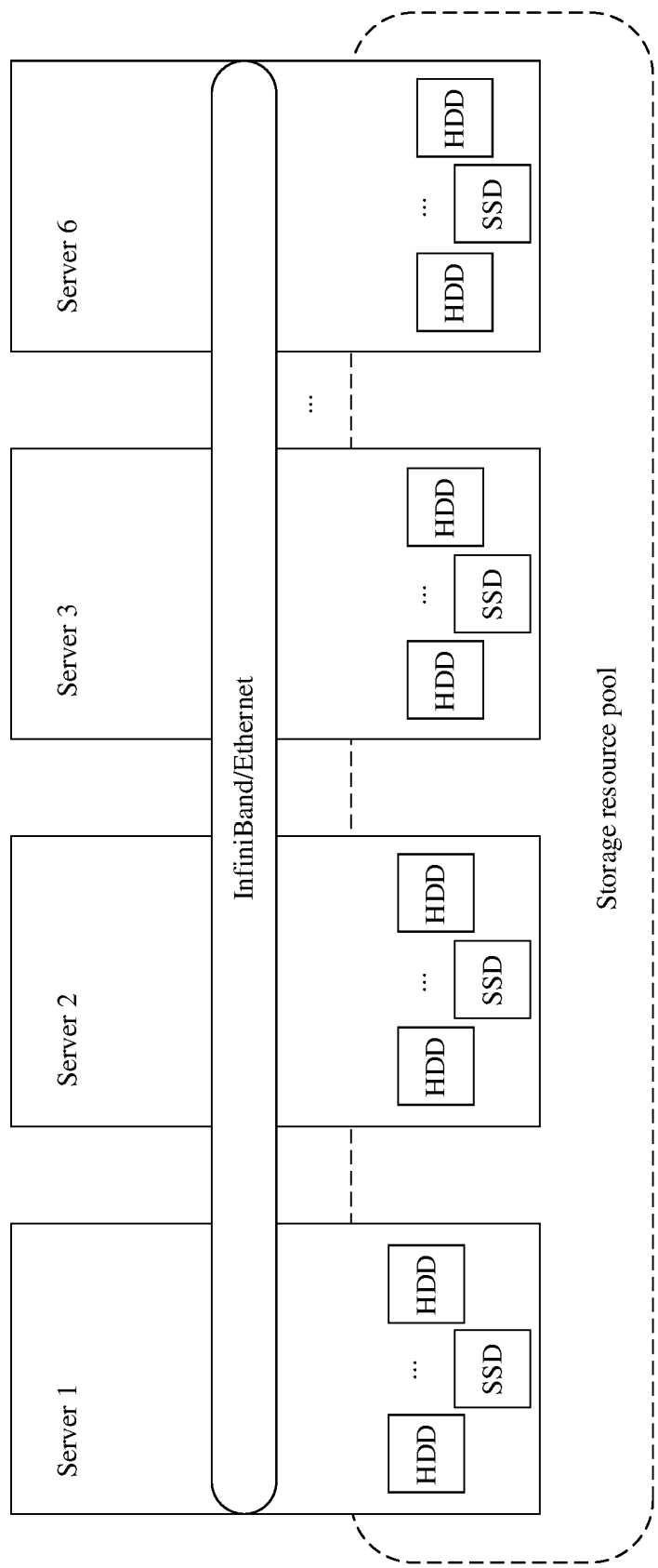
FIG. 3 is a schematic architectural diagram of a distributed storage system according to an embodiment of the present invention.

Further, the storage system in the embodiments of the present invention may also be a distributed storage system (for example, Fusionstorage® series of Huawei®). Fusionstorage® series of Huawei® is used as an example. For example, as shown in FIG. 3, the distributed storage system includes a plurality of servers, such as a server 1, a server 2, a server 3, . . . , and a server 6. The servers communicate with each other over an infinite bandwidth (InfiniBand) or an Ethernet network. In actual application, a quantity of servers in the distributed storage system may be increased or decreased based on an actual requirement. This is not limited in this embodiment of the present invention. The server in the distributed storage system is also referred to as a storage node.

Figures 4, 5:
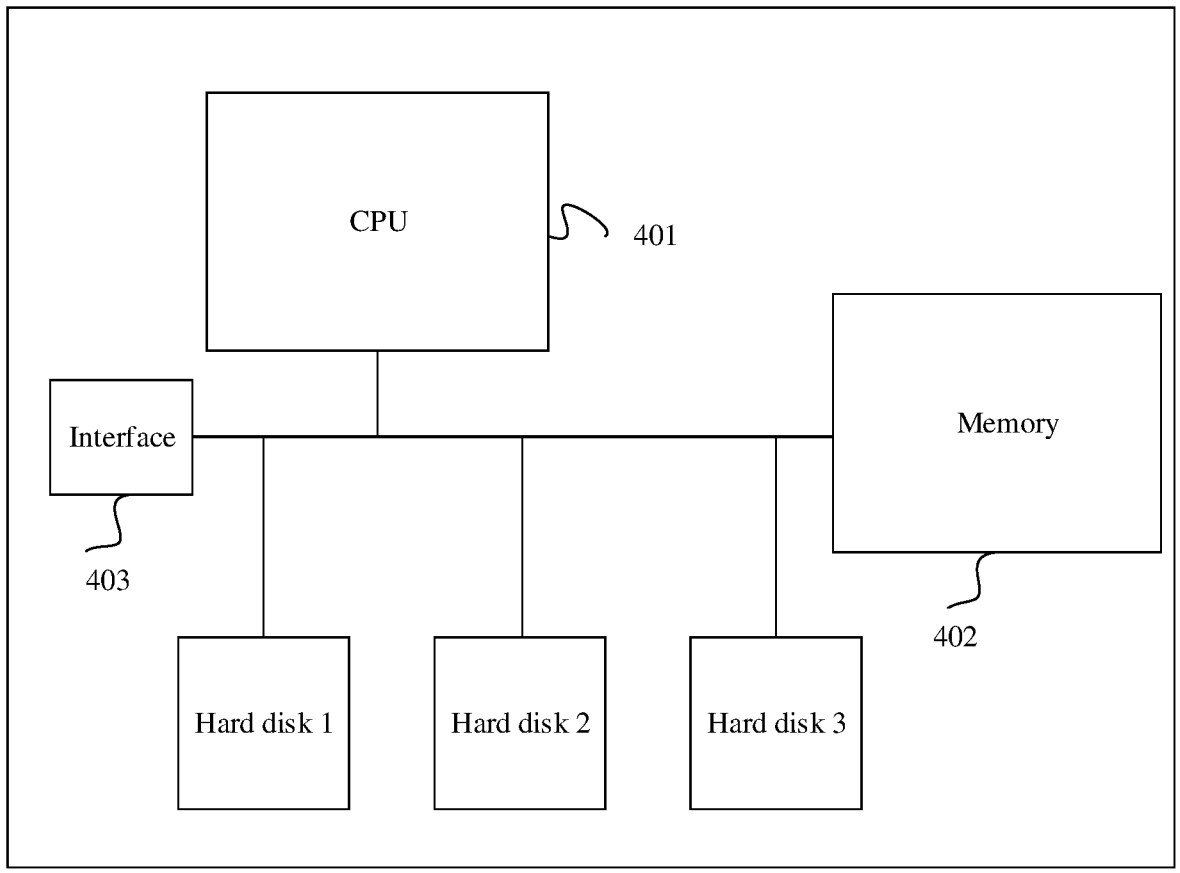
FIG. 4 is a schematic structural diagram of a server in a distributed storage system according to an embodiment of the present invention.
FIG. 5 is a schematic structural diagram of a fingerprint entry of a fingerprint table according to an embodiment of the present invention.

The server in the distributed storage system includes a structure shown in FIG. 4. As shown in FIG. 4, each server in the distributed storage system includes a central processing unit (CPU) 401, a memory 402, an interface 403, a hard disk 1, a hard disk 2, and a hard disk 3. The memory 402 stores a computer instruction, and the CPU 401 executes the program instruction in the memory 402 to perform a corresponding operation. The interface 403 may be a hardware interface, for example, a network interface card (NIC) or a host bus adapter (HBA), or may be a program interface module. The hard disk includes a solid state drive (SSD), a disk, or the like. In addition, the processor 401 may be a central processing unit (CPU), or may be a field programmable gate array (FPGA), or other hardware may be used as a processor, or a combination of an FPGA (or other hardware) and a CPU is used as a processor. The memory 402 in the embodiments of the present invention may provide a memory for the CPU 401. The interface 303 may be a network interface card (NIC), or a host bus adapter (HBA).

The storage system receives data and divides the data into data blocks. The data can be divided into data blocks with a fixed length or data blocks with variable lengths according to different division methods. A fingerprint of the data block (for example, a hash operation is performed on the data block, and a hash value obtained through the operation is used as the fingerprint of the data block) is obtained, and a deduplication operation is performed based on the fingerprint of the data block. Specifically, the deduplication includes: querying whether a fingerprint table includes a same fingerprint (which means that a data block represented by the fingerprint exists in the storage system), if the fingerprint table does not include the fingerprint (which means that a data block represented by the fingerprint does not exist in the storage system), allocating a storage address in the storage system and storing the data block at the storage address, adding a new fingerprint entry to the fingerprint table, that is, establishing mapping between the fingerprint and the storage address, and establishing metadata of the data block, that is, establishing mapping between a logical block address of the data block and the fingerprint. When the data block with the same fingerprint is written into the storage system again, the storage system only needs to establish mapping between a logical block address of the data block that is written again and the fingerprint in the fingerprint table, and does not need to store the data block that is written again. This avoids repeated storage of the same data block. A fingerprint entry of the fingerprint table is shown in FIG. 5, and includes a fingerprint A and a storage address SD for storing data corresponding to the fingerprint. The fingerprint entry may further include a reference count, and the reference count is used to indicate a quantity of data blocks of the fingerprint that is pointed to. For example, when the storage system stores the data block for the first time, the reference count is 1. When the storage system stores the data block for the second time, the reference count is updated to 2.

In the storage system, to query the fingerprint table, the fingerprint table needs to be stored in a memory. To reduce memory usage of the fingerprint table, not all fingerprint tables are loaded in the memory. Therefore, in a deduplication process, the storage system queries and loads a corresponding fingerprint table based on a relationship between fingerprint distribution and the fingerprint table. The foregoing operation process may increase overheads of the storage system. For example, cross-network querying may increase network overheads. A fingerprint query process may also increase resource overheads in the storage system and increase load of the storage system. Resource overheads in this embodiment of the present invention include, for example, overheads of a processor and overheads of a memory. The increasing of overheads may affect performance of the storage system.

In this embodiment of the present invention, to reduce resource overheads of the storage system and improve storage performance of the storage system, whether to perform an inline deduplication operation or reduce a quantity of times of an inline deduplication operation is determined based on the load of the storage system. In this embodiment of the present invention, a load threshold may be set. The storage system calculates the fingerprint of the data block, and when the load of the storage system is less than the load threshold, the storage system queries the fingerprint table to perform the inline deduplication operation on the data block. A specific implementation process includes: querying whether the fingerprint table includes the fingerprint, and when the fingerprint table includes the fingerprint, skipping storing the data block, and establishing mapping between a logical address of the data block and the fingerprint in the fingerprint table; or when the fingerprint table does not include the fingerprint, storing the data block, adding a new fingerprint entry to the fingerprint table, and establishing mapping between a logical address of the data block and the fingerprint in the new fingerprint entry. The new fingerprint entry includes mapping between the fingerprint and a storage address for storing the data block.

When the load of the storage system is greater than the load threshold, the inline deduplication operation is not performed, the data block is directly stored, and mapping between a logical address and a storage address of the data block is established. A mapping entry between the fingerprint of the data block and the storage address of the data block is recorded in a log. The mapping entry includes mapping between the fingerprint of the data block and the storage address of the data block. In this embodiment of the present invention, the storage address is a location of the data block in the storage system. The logical address of the data block is an address that is accessed by a host, for example, a logical block address (Logical Block Address, LBA). In this embodiment of the present invention, the deduplication operation before the storage system stores the data block is referred to as an inline deduplication operation. The deduplication operation performed on the data block stored in the storage system is referred to as a post-deduplication operation.

Figure 6:
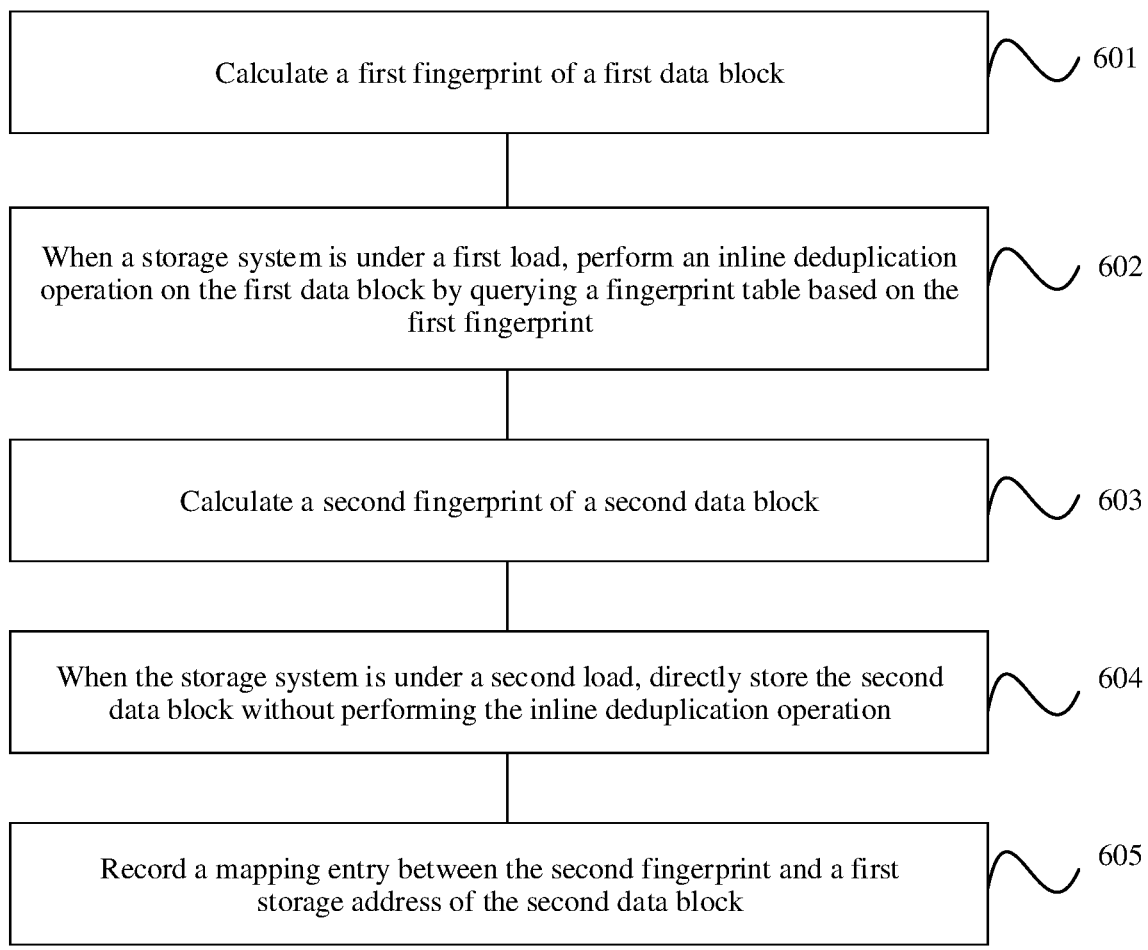
FIG. 6 is a schematic flowchart of deduplication according to an embodiment of the present invention.

In this embodiment of the present invention, whether to perform the inline deduplication operation is determined based on the load of the storage system. A specific procedure is shown in FIG. 6.

Step 601: Calculate a first fingerprint of a first data block.

Step 602: When a storage system is under a first load, perform an inline deduplication operation on the first data block by querying a fingerprint table based on the first fingerprint.

Step 603: Calculate a second fingerprint of a second data block.

Step 604: When the storage system is under a second load, directly store the second data block without performing the inline deduplication operation.

Step 605: Record a mapping entry between the second fingerprint and a first storage address of the second data block.

In this embodiment of the present invention, to prevent the fingerprint from being lost, when no inline deduplication operation is performed, a mapping entry between the fingerprint of the second data block and the first storage address is persistently stored in a log. In this embodiment of the present invention, the first load is less than the second load. For example, the second load is greater than a load threshold, and the first load is less than the load threshold. The mapping entry between the second fingerprint and the first storage address of the second data block includes mapping between the second fingerprint and the first storage address of the second data block.

Whether to perform the inline deduplication operation is determined based on the load of the storage system. This can reduce resource overheads of the inline deduplication, reduce the load of the storage system, and improve performance of the storage system.

In another implementation of this embodiment of the present invention, a plurality of load thresholds may be set, so that different operations are performed in different load ranges. For example, when the storage system is in a highest load range, the inline deduplication operation is not performed on all data blocks, but the data blocks are directly stored in the storage system. In one implementation, an inline deduplication function may be disabled. When the storage system is in a minimum load range, the inline deduplication operation is performed on all data blocks, and then a unique data block that is determined to be stored after the inline deduplication operation is performed, namely, a data block with unique content is stored. When the load of the storage system is between the maximum load and the minimum load, a quantity of times of the inline deduplication operation can be reduced. In specific implementation, for example, only one load threshold may be set, for example, 50%. When the load is greater than 50%, the storage system does not perform the inline deduplication operation on the data block. When the load is less than or equal to 50%, the storage system performs the inline deduplication operation on the data block. In another implementation of this embodiment of the present invention, when there are a plurality of load thresholds, for example, 70% and 40%, loads may be divided into three load ranges. For example, if a load range 1 includes load that is greater than 70%, the load range 1 is denoted as (70%-100%). If a load range 2 includes load that is greater than 40% but not greater than 70%, the load range 2 is denoted as (40%-70%]. If a load range 3 includes load that is not greater than 40%, the load range 3 is denoted as (0-40%]. In this embodiment of the present invention, the load may also be represented in another form.

The load in this embodiment of the present invention may be specifically CPU usage, memory usage, network performance, or the like in the storage system, or may be one or more of these parameters. This is not limited in this embodiment of the present invention.

In this embodiment of the present invention, in the step 605, the mapping entry between the second fingerprint and the first storage address of the second data block is recorded. A specific implementation may be persistently storing in a form of the log. This can prevent fingerprint information from being lost, to help perform the deduplication operation. In another implementation, storage may also be performed in a form of an index table.

Figure 7:
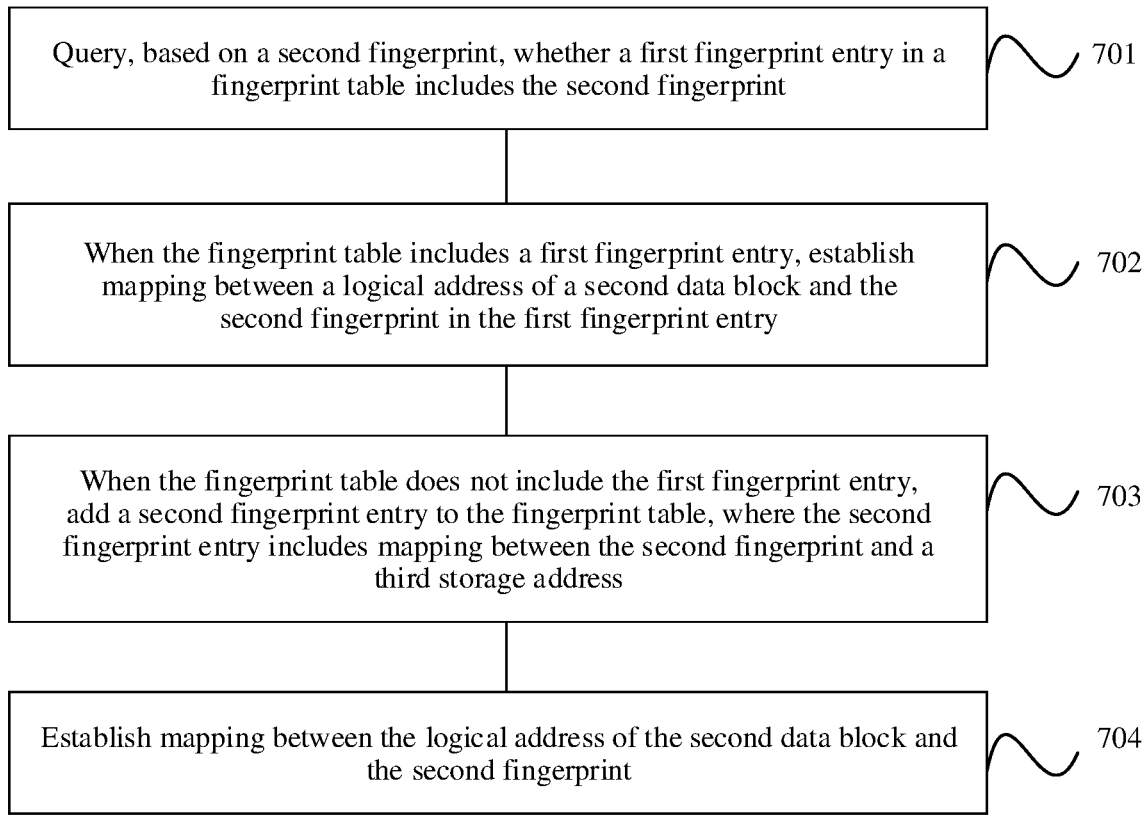
FIG. 7 is a schematic flowchart of deduplication according to an embodiment of the present invention.

In this embodiment of the present invention, whether to perform the inline deduplication operation on the data block is determined based on the load of the storage system. Therefore, there is a case in which a data block is directly stored without being performed the inline deduplication operation. To further save and release storage space, in this embodiment of the present invention, a post-deduplication operation is further performed on the data block. The post-deduplication operation is a deduplication operation performed on a data block that has been stored in the storage system. With reference to the embodiment shown in FIG. 6, an embodiment of the present invention as shown in FIG. 7 includes the following steps.

Step 701: Query, based on a second fingerprint, whether a first fingerprint entry in a fingerprint table includes the second fingerprint.

The first fingerprint entry includes mapping between the second fingerprint and a second storage address, and the second storage address stores a data block that has same content as the second data block.

Step 702: When the fingerprint table includes the first fingerprint entry, establish mapping between a logical address of the second data block and the second fingerprint in the first fingerprint entry.

Step 703: When the fingerprint table does not include the first fingerprint entry, add a second fingerprint entry to the fingerprint table, where the second fingerprint entry includes mapping between the second fingerprint and a third storage address, and the third storage address is used to store the second data block migrated by the storage system from the first storage address.

In another implementation, the second fingerprint entry includes mapping between the second fingerprint and the first storage address.

Step 704: Establish mapping between the logical address of the second data block and the second fingerprint.

The second fingerprint in the mapping between the logical address of the second data block and the second fingerprint is the second fingerprint in the first fingerprint entry or the second fingerprint in the second fingerprint entry.

Further, the embodiment shown in FIG. 7 further includes: deleting the mapping entry between the second fingerprint and the first storage address. After deduplication is performed, the mapping entry that records the second fingerprint and the first storage address is deleted. In this embodiment of the present invention, the mapping entry between the second fingerprint and the first storage address is persistently recorded in a form of a log. In the log, there may be a plurality of mapping entries that all include the second fingerprint, but data blocks corresponding to all the second fingerprints are stored at different locations in the storage system. In other words, storage addresses in the plurality of mapping entries are different. In the log, if the plurality of mapping entries all include the second fingerprint, it indicates that an inline deduplication operation is not performed on a plurality of data blocks, and the plurality of data blocks are directly stored in the storage system. The mapping entry in the log may be clustered based on the fingerprint. To be specific, mapping entries with a same fingerprint are arranged together. In this way, data blocks that have same content and on which no inline deduplication operation is performed can be determined. Then, step 701 to step 704 are performed. There are a plurality of mapping entries with a same fingerprint, for example, the second fingerprint, and accordingly, there are a plurality of same data blocks. If all these data blocks each are a valid data block, mapping between a logical address of each of the data blocks and the second fingerprint in the fingerprint table is separately established. The valid data block is a data block that is not modified, or a data block whose mapping between a logical address of the data block and a storage address of the data block is valid before a post-deduplication operation is performed. Further, after the deduplication operation is performed, the plurality of mapping entries in the log are deleted. In another implementation of this embodiment of the present invention, before the post-deduplication operation is performed, the plurality of mapping entries in the log are deleted.

A plurality of mapping entries with a same fingerprint, for example, the second fingerprint, are recorded in the log. The storage addresses in the plurality of mapping entries are different. These storage addresses may be located on a plurality of storage nodes that use distributed storage. Data blocks at the storage addresses may be data blocks that are stored after being compressed. These data blocks may be compressed by using different compression algorithms. In other words, a compression rate and compression performance of a compression algorithm used by each data block varies.

The storage address in the fingerprint entry of the fingerprint table provided in this embodiment of the present invention is dedicated storage space allocated by the storage system, and is used to store a data block on which the deduplication operation (inline deduplication and post-deduplication) is performed. Therefore, for a data block that is directly stored and on which the inline deduplication operation is not performed, a corresponding fingerprint is not found in the fingerprint table after the post-deduplication operation is performed, and the data block needs to be migrated to storage space dedicated to store a data block on which the deduplication operation is performed. For example, in the step 703 in the embodiment shown in FIG. 7, when the fingerprint table does not include the first fingerprint entry, a second fingerprint entry is added to the fingerprint table, where the second fingerprint entry includes mapping between the second fingerprint and a third storage address, and the third storage address is used to store the second data block migrated by the storage system from the first storage address.

In a scenario in which the plurality of mapping entries with the same fingerprint are recorded in the log, when it is determined that the same fingerprint is a new fingerprint in the storage system, one storage address is selected from a plurality of storage addresses in the plurality of mapping entries, a data block at the selected storage address is migrated to storage space, for example third storage space in the step 703, dedicated to store a data block on which the deduplication operation is performed. A new fingerprint entry is established in the fingerprint table. For example, in step 703, the fingerprint entry includes mapping between the second fingerprint and the third storage address. When a data block that needs to be migrated is selected from the plurality of data blocks with the same fingerprint, the to-be-migrated data block is selected based on factors such as whether the data block is compressed, a compression rate of the data block, a distance between the data block and storage space dedicated to store a data block on which the deduplication operation is performed. In other words, the to-be-migrated data block is a data block that needs to be reserved after the post-deduplication operation is performed. A compressed data block is preferentially used as a to-be-migrated data block than a decompressed data block. A data block that is compressed by using a compression algorithm with a high compression rate is preferentially used as a to-be-migrated data block than a data block that is compressed by using a compression algorithm with a low compression rate. A data block that has a short distance from migrating to storage space dedicated to store a data block on which the deduplication operation is performed is preferentially used as a to-be-migrated data block than a data block that has a long distance from migrating to storage space dedicated to store a data block on which the deduplication operation is performed. When the to-be-migrated data block is selected based on the at least two factors, priorities in descending order are as follows: a data block that has a short distance from migrating to storage space dedicated to store a data block on which the deduplication operation is performed and that is compressed by using a compression algorithm with a high compression rate, a data block that has a long distance from migrating to storage space dedicated to store a data block on which the deduplication operation is performed and that is compressed by using a compression algorithm with a high compression rate, a data block that has a short distance from migrating to storage space dedicated to store a data block on which the deduplication operation is performed and that is compressed by using a compression algorithm with a low compression rate, a data block that has a long distance from migrating to storage space dedicated to store a data block on which the deduplication operation is performed and that is compressed by using a compression algorithm with a low compression rate, a data block that has a short distance from migrating to storage space dedicated to store a data block on which the deduplication operation is performed and that is not compressed, and a data block that has a long distance from migrating to storage space dedicated to store a data block on which the deduplication operation is performed and that is not compressed. In this embodiment of the present invention, in a process of migrating the compressed data block, the data block does not need to be decompressed. In this embodiment of the present invention, the distance from migrating to the storage space dedicated to store the data block on which the deduplication operation is performed is a distance between a storage node on which a storage address of a current storage data block is located and a storage node on which the storage space dedicated to store a data block on which the deduplication operation is performed is located. For example, whether the data block needs to be migrated across a network (for example, whether the storage address of the current storage data block and the storage space dedicated to store the data block are on a same storage node) and a quantity of hops in the network. In this embodiment of this application, the data block migration policy can be used to reduce resource consumption of the storage system in a data migration process and to improve performance of the storage system.

A solution of selecting the to-be-migrated data block in this embodiment of the present invention may also be applied to a solution in which the log is not used. This is not limited in this embodiment of the present invention.

In this embodiment of the present invention, the post-deduplication operation may also be performed based on the load of the storage system. This improves performance of the storage system.

Based on the foregoing embodiment, an embodiment of the present invention provides a data processing device. The data processing device includes a calculation unit 801, a deduplication unit 802, a storage unit 803, and a recording unit 804, where the calculation unit 801 is configured to calculate a first fingerprint of a first data block; the inline deduplication unit 802 is configured to: when the storage system is under a first load, perform an inline deduplication operation on the first data block by querying a fingerprint table based on the first fingerprint, where the calculation unit 801 is further configured to calculate a second fingerprint of a second data block; the storage unit 803 is configured to: when the storage system is under a second load, directly store the second data block without performing the inline deduplication operation, where the first load is less than the second load; and the recording unit 804 is configured to record a mapping entry between the second fingerprint and a first storage address of the second data block, where the mapping entry is used to record mapping between the second fingerprint and the first storage address of the second data block.

Figure 8:
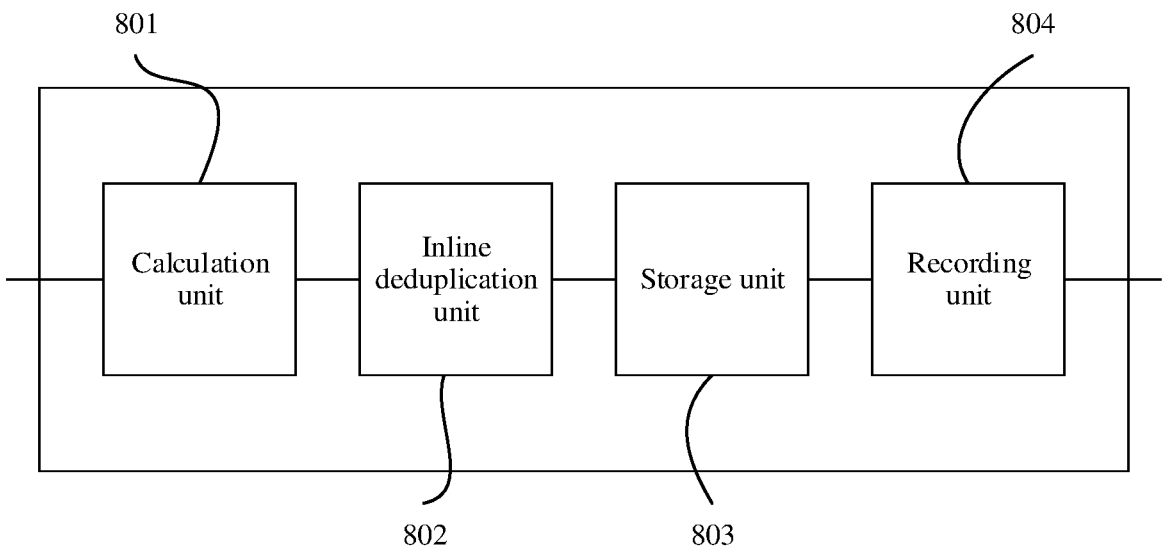
FIG. 8 is a schematic structural diagram of a data processing device according to an embodiment of the present invention.

Further, the data processing device shown in FIG. 8 further includes:

a query unit, configured to query, based on the second fingerprint, whether the fingerprint table includes a first fingerprint entry, where the first fingerprint entry includes mapping between the second fingerprint and a second storage address, and the second storage address stores a data block that has same content as the second data block;

an establishment unit, configured to: when the fingerprint table includes the first fingerprint entry, establish mapping between a logical address of the second data block and the second fingerprint in the first fingerprint entry; and an adding unit configured to: when the fingerprint table does not include the first fingerprint entry, add a second fingerprint entry to the fingerprint table, where the second fingerprint entry includes mapping between the second fingerprint and a third storage address, and the third storage address is used to store a storage address of a second data block migrated by the storage system from the first storage address, where the establishment unit is further configured to establish mapping between the logical address of the second data block and the second fingerprint.

Further, the data processing device further includes: a deletion unit, configured to delete the mapping entry between the second fingerprint and the first storage address of the second data block.

Further, the recording unit 804 is specifically configured to record, in a log, the mapping entry between the second fingerprint and the first storage address of the second data block.

Further, the data processing device further includes: a determining unit, configured to determine whether a plurality of mapping entries recorded in the log include the second fingerprint, where the plurality of mapping entries all include the second fingerprint, but storage addresses in the plurality of mapping entries are different, where the establishment unit is further configured to establish mapping between a logical address of a data block stored at another storage address other than the first storage address in the plurality of mapping entries and the second fingerprint in the fingerprint table.

Further, the data processing device further includes a deletion unit, and the deletion unit is configured to delete the plurality of mapping entries.

Further, the processing device further includes a selection unit, and the selection unit is configured to select the first storage address from the storage addresses in the plurality of mapping entries according to a migration policy, and migrate the second data block at the first storage address to the third storage address.

The present disclosure provides a computer-readable storage medium. The computer-readable storage medium stores an instruction, and when a processor runs the instruction, the processor is configured to perform functions of the data processing device in the embodiments of the present invention.

The present disclosure provides a computer program product including an instruction. When a processor runs the instruction in the computer program product, the processor is configured to perform functions of the data processing device in the embodiments of the present invention.

For specific implementations of the data processing device, the computer-readable storage medium, and the computer program product provided in the embodiments of the present invention, refer to the foregoing descriptions in the embodiments of the present invention. Details are not described herein again.

It may be understood that the memory mentioned in the embodiments of the present invention may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, or another programmable logic device, discrete gate, transistor logic device, or discrete hardware component, the memory (storage module) may be integrated into the processor.

It should be noted that the memory described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present invention, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

What is claimed is:

1. A method comprising:
obtaining, by an electronic device, a load of a storage system;
comparing, by the electronic device, a load threshold with the load on the storage system that receives a data block to be stored in the storage system to determine whether the load is greater than or less than the load threshold;
determining, by the electronic device, based on that the load is less than the load threshold, to perform inline deduplication on the data block;
when the load on the storage system is less than the load threshold, performing, by the electronic device, the inline deduplication on the data block,
wherein the load comprises a processor load;
after the performing the inline deduplication on the data block, obtaining, by the electronic device, a second load of the storage system, the second load being different from the load of the storage system;
comparing, by the electronic device, the load threshold and the second load on the storage system that receives a second data block to be stored in the storage system to determine whether the second load is greater than or less than the load threshold, the second load being different from the load of the storage system;
determining, by the electronic device, based on that the second load is greater than the load threshold, to skip performing inline deduplication on the second data block, wherein no inline deduplication operation is performed while the second load is greater than the load threshold;
skipping performing the inline deduplication on the second data block by directly storing, by the electronic device, the second data block at a second storage address without performing the inline deduplication on the second data block;
recording, by the electronic device, a mapping entry between a second fingerprint of the second data block and the second storage address of the second data block in a log,
wherein a value of the load threshold is preset before the obtaining the load, and the value of the load threshold remains the same from the obtaining the load to the recording the mapping entry;
determining, by the electronic device, that a fingerprint table including a fingerprint of the data block does not include the second fingerprint;
determining, by the electronic device, the log includes a plurality of mapping entries with the second fingerprint, wherein storage addresses of the plurality of mapping entries are different;
selecting, by the electronic device, a to-be-migrated data block from data blocks corresponding to the plurality of mapping entries based on whether the to-be-migrated data block is compressed, a compression rate of the to-be-migrated data block, and a distance between the to-be-migrated data block and storage space dedicated to store the second data block;
performing, by the electronic device, a post-deduplication on the second data block; and
storing, by the electronic device, the second data block after the post-deduplication on the second data block at a third storage address in a corresponding mapping entry corresponding to the to-be-migrated data block.

2. The method according to claim 1, further comprising:
initiating, by the electronic device, the post-deduplication based on the load of the storage system.

3. The method according to claim 1, wherein the load further comprises at least one of:
a memory load or a network load.

4. The method according to claim 1, wherein the skipping performing the inline deduplication comprises:
temporarily skipping, by the electronic device, a deduplication operation on the second data block.

5. The method according to claim 1, wherein the performing the inline deduplication comprises:
inline querying, by the electronic device, whether the fingerprint table includes a first fingerprint that is same as a fingerprint of the data block;
storing, by the electronic device, the data block when the fingerprint table does not include the first fingerprint, and adding the fingerprint of the data block to the fingerprint table; and
skipping storing, by the electronic device, the data block when the fingerprint table includes the first fingerprint.

6. The method according to claim 5, further comprising:
loading, by the electronic device, the fingerprint table into a memory of the storage system.

7. The method according to claim 1, further comprising:
compressing, by the electronic device, the data block.

8. The method according to claim 7, further comprising:
compressing, by the electronic device, different data blocks with different compression algorithms.

9. The method of claim 1,
the plurality of mapping entries being arranged together.

10. The method of claim 9, wherein one of the plurality of mapping entries with the second fingerprint is persistently stored in the log.

11. The method of claim 1, further comprising:
deleting, by the electronic device, the mapping entry from the log after the performing the post-deduplication on the second data block.

12. The method of claim 1, further comprising:
receiving, by the electronic device, a third data block to be stored in the storage system;
obtaining, by the electronic device, a third load of the storage system, the third load being different from the load and the second load of the storage system;
determining, by the electronic device, based on that the third load is less than the load threshold and greater than a second threshold, a quantity of times of inline deduplication can be reduced; and
determining, by the electronic device, whether to perform inline deduplication on the third data block based on a reduced quantity of times of inline deduplication.

13. An apparatus, comprising:
at least one processor and a non-transitory memory,
the non-transitory memory stores a computer program that, when executed by the at least one processor, causes the apparatus to perform operations comprising:
obtaining a load of a storage system;
comparing a load threshold with the load on the storage system that receives a data block to be stored in the storage system to determine whether the load is greater than or less than the load threshold;
determining, based on that the load is less than the load threshold, to perform inline deduplication on the data block;

when the load on the storage system is less than the load threshold, performing the inline deduplication on the data block, wherein the load comprises a processor load;

after the performing the inline deduplication on the data block, obtaining a second load of the storage system, the second load being different from the load of the storage system;

comparing the load threshold and the second load on the storage system that receives a second data block to be stored in the storage system to determine whether the second load is greater than or less than the load threshold, the second load being different from the load of the storage system;

determining, based on that the second load is greater than the load threshold, to skip performing inline deduplication on the second data block, wherein no inline deduplication operation is performed while the second load is greater than the load threshold;

skipping performing the inline deduplication on the second data block by directly storing the second data block at a second storage address without performing the inline deduplication on the second data block;

recording a mapping entry between a second fingerprint of the second data block and the second storage address of the second data block in a log, wherein a value of the load threshold is preset before the obtaining the load, and the value of the load threshold remains the same from the obtaining the load to the recording the mapping entry;

determining that a fingerprint table including a fingerprint of the data block does not include the second fingerprint;

determining the log includes a plurality of mapping entries with the second fingerprint, wherein storage addresses of the plurality of mapping entries are different;

selecting a to-be-migrated data block from data blocks corresponding to the plurality of mapping entries based on whether the to-be-migrated data block is compressed, a compression rate of the to-be-migrated data block, and a distance between the to-be-migrated data block and storage space dedicated to store the second data block;

performing a post-deduplication on the second data block; and storing the second data block after the post-deduplication on the second data block at a third storage address in a corresponding mapping entry corresponding to the to-be-migrated data block.

14. The apparatus according to claim 13, wherein the operations further comprise:
initiating the post-deduplication based on the load on the storage system.

15. The apparatus according to claim 13, wherein the load comprises at least one of:
a memory load or a network load.

16. The apparatus according to claim 13, wherein the skipping performing the inline deduplication comprises:
temporarily skipping a deduplication operation on the second data block.

17. The apparatus according to claim 13, wherein the performing the inline deduplication comprises:
inline querying whether the fingerprint table includes a first fingerprint that is same as a fingerprint of the data block;

storing the data block when the fingerprint table does not include the first fingerprint, and adding the fingerprint of the data block to the fingerprint table; and skipping storing the data block when the fingerprint table includes the first fingerprint.

18. The apparatus according to claim 17, wherein the operations further comprise:
loading the fingerprint table into a memory of the storage system.

19. The apparatus according to claim 13, wherein the operations further comprise:
compressing the data block.

20. The apparatus according to claim 19, wherein the operations further comprise:
compressing different data blocks with different compression algorithms.

21. A non-transitory computer-readable media storing computer instructions, that, when executed by one or more processors, cause the one or more processors to perform operations comprising:

obtaining a load of a storage system;

comparing a load threshold with the load on the storage system that receives a data block to be stored in the storage system to determine whether the load is greater than or less than the load threshold;

determining, based on that the load is less than the load threshold, to perform inline deduplication on the data block;

when the load on the storage system is less than the load threshold, performing the inline deduplication on the data block, wherein the load comprises a processor load;

after the performing the inline deduplication on the data block, obtaining a second load of the storage system, the second load being different from the load of the storage system;

comparing the load threshold and the second load on the storage system that receives a second data block to be stored in the storage system to determine whether the second load is greater than or less than the load threshold, the second load being different from the load of the storage system;

determining, based on that the second load is greater than the load threshold, to skip performing inline deduplication on the second data block, wherein no inline deduplication operation is performed while the second load is greater than the load threshold;

skipping performing the inline deduplication on the second data block by directly storing the second data block at a second storage address without performing the inline deduplication on the second data block;

recording a mapping entry between a second fingerprint of the second data block and the second storage address of the second data block in a log, wherein a value of the load threshold is preset before the obtaining the load, and the value of the load threshold remains the same from the obtaining the load to the recording the mapping entry;

determining that a fingerprint table including a fingerprint of the data block does not include the second fingerprint;

determining the log includes a plurality of mapping entries with the second fingerprint, wherein storage addresses of the plurality of mapping entries are different;

selecting a to-be-migrated data block from data blocks corresponding to the plurality of mapping entries based on whether the to-be-migrated data block is compressed, a compression rate of the to-be-migrated data block, and a distance between the to-be-migrated data block and storage space dedicated to store the second data block;

performing a post-deduplication on the second data block; and storing the second data block after the post-deduplication on the second data block at a third storage address in a corresponding mapping entry corresponding to the to-be-migrated data block.

* * * * *